(12) United States Patent
Bhattacharyya et al.

(10) Patent No.: US 8,238,913 B1
(45) Date of Patent: Aug. 7, 2012

(54) WIRELESS NETWORK AUGMENTATION USING OTHER WIRELESS NETWORKS

(75) Inventors: Supratik Bhattacharyya, San Francisco, CA (US); Jean Bolot, Mountain View, CA (US); Aaditeshwar Seth, Waterloo (CA); Srinivasan Keshav, Waterloo (CA)

(73) Assignee: Sprint Communications Company L.P., Overland Park, KS (US)

( * ) Notice: Subject to any disclaimer, the term of this patent is extended or adjusted under 35 U.S.C. 154(b) by 640 days.

(21) Appl. No.: 11/747,517

(22) Filed: May 11, 2007

Related U.S. Application Data (63) Continuation-in-part of application No. 11/277,241, filed on Mar. 23, 2006.

(60) Provisional application No. 60/764,995, filed on Feb. 3, 2006.

(51) Int. Cl.
*H04W 36/00* (2009.01)
(52) U.S. Cl. ............... 455/436; 455/432.2; 370/331
(58) Field of Classification Search .......... 370/331–335, 370/310.2, 328, 338, 342, 10.2, 351–356, 370/466, 467; 455/404.2, 414.2, 421, 414.1, 455/418–422.1, 426.1–458, 550.1–562.1
See application file for complete search history.

(56) References Cited

U.S. PATENT DOCUMENTS

| | | | |
|---|---|---|---|
| 5,722,072 A * | 2/1998 | Crichton et al. ............... | 455/437 |
| 5,857,112 A | 1/1999 | Hashemi et al. | |
| 6,826,154 B2 * | 11/2004 | Subbiah et al. ............... | 370/236 |
| 7,502,624 B2 * | 3/2009 | Rasanen ............... | 455/552.1 |
| 7,532,596 B2 | 5/2009 | Trossen et al. | |
| 2004/0170122 A1 * | 9/2004 | Guo et al. ............... | 370/210 |
| 2005/0047412 A1 | 3/2005 | Hares | |
| 2005/0070288 A1 * | 3/2005 | Belkin et al. ............... | 455/439 |
| 2006/0270447 A1 | 11/2006 | Everson et al. | |
| 2007/0060123 A1 | 3/2007 | Maes | |

OTHER PUBLICATIONS

"Adaptive Connectivity Management Hybrid Wireless and Mobile Networking Environment" by Jun-Zhao Sun and Jaaklo Sauvola, 2006, University of Oulu, Finland.*

A. Seth, S. Bhattacharyya, S. Keshav, "Application Support for Opportunistic Communication on Multiple Wireless Networks," School of Computer Science, University of Waterloo, Ontario, Canada, Sprint Advanced Technology Labs, Burlingame, California, USA.

Srinivasan Keshav, Supratik Bhattacharya, Tao Ye and Jean Bolot, "Opportunistic Data Transfer Over Heterogenous Wireless Networks," Sprint Advanced Technology Laboratory, One Adrian Court, Burlingame, California 94010, 2005.

Office Action from U.S. Appl. No. 11/277,241, Jul. 2009.

* cited by examiner

*Primary Examiner* — Kent Chang
*Assistant Examiner* — San Htun (57) ABSTRACT

Systems and methods are discussed for providing multiple network interfaces to devices to communicate with each other using various policies, for using a proxy to maintain a connection with a legacy system such that a data connection to the legacy system may be continued when an end device connects with the proxy, and for maintaining application states when devices become disconnected such that their activities may be resumed when reconnected. Multiple wireless networks allow communication sessions to transfer across each of the multiple wireless networks in a seamless fashion. One wireless network may control the handoff to another wireless network or a mobile device with an OCMP may control the handoff.

12 Claims, 10 Drawing Sheets

WIRELESS NETWORK AUGMENTATION USING OTHER WIRELESS NETWORKS

CROSS-REFERENCE TO RELATED APPLICATIONS

This application is a continuation-in-part of U.S. application Ser. No. 11/277,241 filed Mar. 23, 2006 which claims the benefit of U.S. Provisional Application No. 60/764,995 filed Feb. 3, 2006, both herein incorporated by reference.

STATEMENT REGARDING FEDERALLY SPONSORED RESEARCH OR DEVELOPMENT

Not applicable.

BACKGROUND

The past few years have seen an explosive growth in the number of mobile devices such as cellphones, PDAs, and laptop computers. These devices can use a variety of wireless access technologies. These range from wide-area technologies such as GPRS, EDGE, CDMA 1 xRTT, EV-DO, and satellite access, to local-area technologies such as 802.11a/b/g and short-range technologies such as Bluetooth, Zigbee, etc. However, any wireless access technology must make a difficult tradeoff between the coverage of an access point and the capacity available to a user in that access point's coverage area. To offer wireless access in a given geographical area, wide-area wireless access technologies require fewer access points but offer inherently lower per-user capacity. Short-range access networks can offer large per-user capacity, but the capital cost to offer coverage in large geographical areas can be prohibitive. Consequently, no single wireless access technology can be expected to provide ubiquitous, high-bandwidth coverage. For example, high-speed 802.11a/b/g access coverage is typically confined to WLANs inside buildings and public hot-spots. In contrast, lower-speed WWAN technologies such as CDMA 1 xRTT and GPRS provide far wider coverage, although even such technologies cannot be expected to be available everywhere and coverage can be decidedly spotty inside enclosed areas. Although city-wide 802.11 mesh network deployment tries to provide ubiquitous wireless broadband access, the success is limited because of external interference in the 2.4 GHz band, and a reduction in capacity when the multi-hop count is large. Note that, besides this coverage-capacity tradeoff, managed wireless technologies impose limits on the number of simultaneous users in a given geographic area. This may prevent a user from using a network even when it is available.

Fortunately, current and future mobile devices are likely to come equipped with multiple wireless interfaces that can be used either singly or in parallel.

SUMMARY

The presenting invention is defined by the claims below. Embodiments of the present invention solve at least the above problems by providing a system and method for, among other things, creating opportunistic data transfer over heterogeneous wireless networks. The present invention has several practical applications in the technical arts including providing multiple network interfaces to devices to communicate with each other using various policies, using a proxy to maintain a connection with a legacy system such that a data connection to the legacy system may be continued when an end device connects with the proxy, and maintaining application states when devices become disconnected such that their activities may be resumed when reconnected.

In a first aspect, a computer system having a processor and a memory to execute a method for selecting a communication path across different access networks is provided that includes detecting access networks by a client with network interfaces. Each of the network interfaces and the access networks includes a same communication technology or a different communication technology. Based on an application or a routing policy, the communication path between the client and a host is selected. The host includes second network interfaces connected to the access networks. The communication path between the client and the host is maintained. The communication path between the client and the host is changed to another communication path based on the application, another application, the routing policy, or another routing policy.

In another aspect, a system for selecting a communication path across different access networks is provided that includes a client with a first set of network interfaces communicating with a host with second set of network interfaces. The client selects members of the first set of network interfaces to communicate across access networks to members of the second set of network interfaces at the host, and select a communication path to the host using a member of the first set of network interfaces, a member of the access networks, and a member of the second set of network interfaces based on an application or a routing policy. The first set of network interfaces, the access networks, and the second set of network interfaces respectively use a same communication technology or a different communication technology. The client and the host maintain the communication path and change to another communication path based on the application, the routing policy, another application, or another routing policy.

In yet another aspect, a computer system having a processor and a memory to execute a method for maintaining a communication connection between an endpoint device and computing devices when the endpoint device disconnects and reconnects to establish the communication connection is provided that includes implementing a proxy element between the endpoint device and the computing devices. The proxy element is connected to first network interfaces of the endpoint device and the proxy element is connected to second network interfaces of the computing devices. With the proxy element, the communication connection is facilitated between the endpoint device and the computing devices. A first portion of the communication connection is maintained between the proxy element and the endpoint device. A second portion of the communication connection is maintained between the proxy element and the computing devices. A set of communications details between the endpoint device and the proxy element is shielded from the computing devices. A disconnection and a reconnection is performed by the endpoint device at the first portion of the communication connection without losing the second portion of the communication connection. The proxy element stores and forwards a set of data transferred between the computing devices and the endpoint device.

In yet another aspect, a system for maintaining a communication connection between an endpoint device and computing devices when the endpoint device disconnects and reconnects to establish the communication connection is provided that includes a transfer of information between the endpoint device with first network connections, a proxy element, and the computing devices with second network connections. The computing devices run applications to interact with the endpoint device. The proxy element located between the endpoint device and the computing devices facilitate the transfer of information between the endpoint device and the computing devices, maintain a first portion of the communication connection between the proxy element and the endpoint device, maintain a second portion of the communication connection between the proxy element and the computing devices, shield a set of communications details between the endpoint device and the proxy element from the computing devices, allow a disconnection and a reconnection by the endpoint device at the first portion of the communication connection without losing the second portion of the communication connection, and store and forward a set of information transferred between the computing devices and the endpoint device.

In yet another aspect, a computer system having a processor and a memory to execute a method for exchanging data between a computing device and a client, when changing network interfaces or encountering a loss of connectivity, is provided that includes providing the computing device with first network interfaces and the client with second network interfaces to communicate over network connections using communication technologies. A data transfer is performed using data striping between the computing device and the client over several members of the network connections, or over a member of the first network interfaces and a member of the second network interfaces using a member of the network connections. The data transfer is stopped when a disconnection occurs between the computing device and the client. The disconnection includes a loss of power to the computing device, the loss of power to the client, or a change from the member of the second network interfaces to another member of the second network interfaces. A first application state is maintained at the computing device and a second application state is maintained at the client to track a condition of the data transfer. The data transfer is resumed using the first application state or the second application state when a reconnection between the computing device and the client occurs.

In yet another aspect, a computer system having a processor and a memory to execute a method for maintaining a wireless communication connection over different wireless technologies is provided that includes communicating between the mobile device and another device over a first wireless technology in a first wireless network. The mobile device detects a second wireless technology in a second wireless network while communicating with the another device over the first wireless technology in the first wireless network. Based on policies, a signal strength, or a bandwidth, the communication between the mobile device and the another device is transferred from the first wireless technology in the first wireless network to the second wireless technology in the second wireless network. The communication is maintained between the mobile device and the another device.

In yet another aspect, a computer system having a processor and a memory to execute a method for seamlessly transferring a communication connection from a first wireless network and a mobile device to a second wireless network and the mobile device that includes operating the mobile device in a communication session in the first wireless network. The first wireless network implements an OCMP, knows a location of the mobile device, and knows the location of the second wireless network. When the mobile device moves into a vicinity of the second wireless network, with the OCMP and if a set of conditions is met, the communication session is transferred seamlessly from the first wireless network to the second wireless network. The OCMP interfaces with the first wireless network and the second wireless network to facilitate a transfer.

In yet another aspect, a system for a simultaneous data transfer communicating with multiple wireless networks is provided that includes an OCMP operable to interface with the multiple wireless networks. The OCMP is a set of computer software. The OCMP operates to provide for a simultaneous download or a simultaneous upload of a set of information between an application, a mobile device, or a computing device and the multiple networks. The set of information transfers simultaneously over each of the multiple networks. The OCMP operates to aggregate the set of information that is downloaded or uploaded at the at the application, the mobile device, or the computing device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for providing multiple network interfaces to devices to communicate with each other using various policies, for using a proxy to maintain a connection with a legacy system such that a data connection to the legacy system may be continued when an end device connects with the proxy, and for maintaining application states when devices become disconnected such that their activities may be resumed when reconnected.

ACRONYMS AND SHORTHAND NOTATIONS

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ATM | Asynchronous Transfer Mode |
| CDMA | Code Division Multiple Access |
| EDGE | Enhance Data Rates for GSM (and TDMA) Evolution |
| EV-DO | Evolution Data Only or Evolution Data Optimized |
| FTTH | Fiber To The Home |
| GPRS | General Packet Radio Services |
| GSM | Global System for Mobile Communications |
| HSCSD | High Speed Circuit Switched Data |
| MPLS | Multi-protocol Label Switching |
| OCMP | Opportunistic Communication Management Protocol or Opportunistic Connection Management Protocol |
| QoS | Quality of Service |
| RTP | Real-Time Transport Protocol |
| SAR | Segmentation-and-Reassembly |
| SIP | Session Initiation Protocol |
| SMS | Short Message Service |
| TCP | Transmission Control Protocol |
| UDP | User Datagram Protocol |
| UMTS | Universal Mobile Telephone System |
| VOP | Voice Over Packet |
| W-CDMA | Wide Code Division Multiple Access |
| WiFi | Wireless Fidelity |
| WiMax | Worldwide Interoperability Microwave Access |
| 1xRTT | Single Carrier Radio Transmission Technology |

Further, various technical terms are used throughout this description. A definition of such terms can be found in *Newton's Telecom Dictionary* by H. Newton, $21^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Opportunistic Data Transfer

Figure 1A:
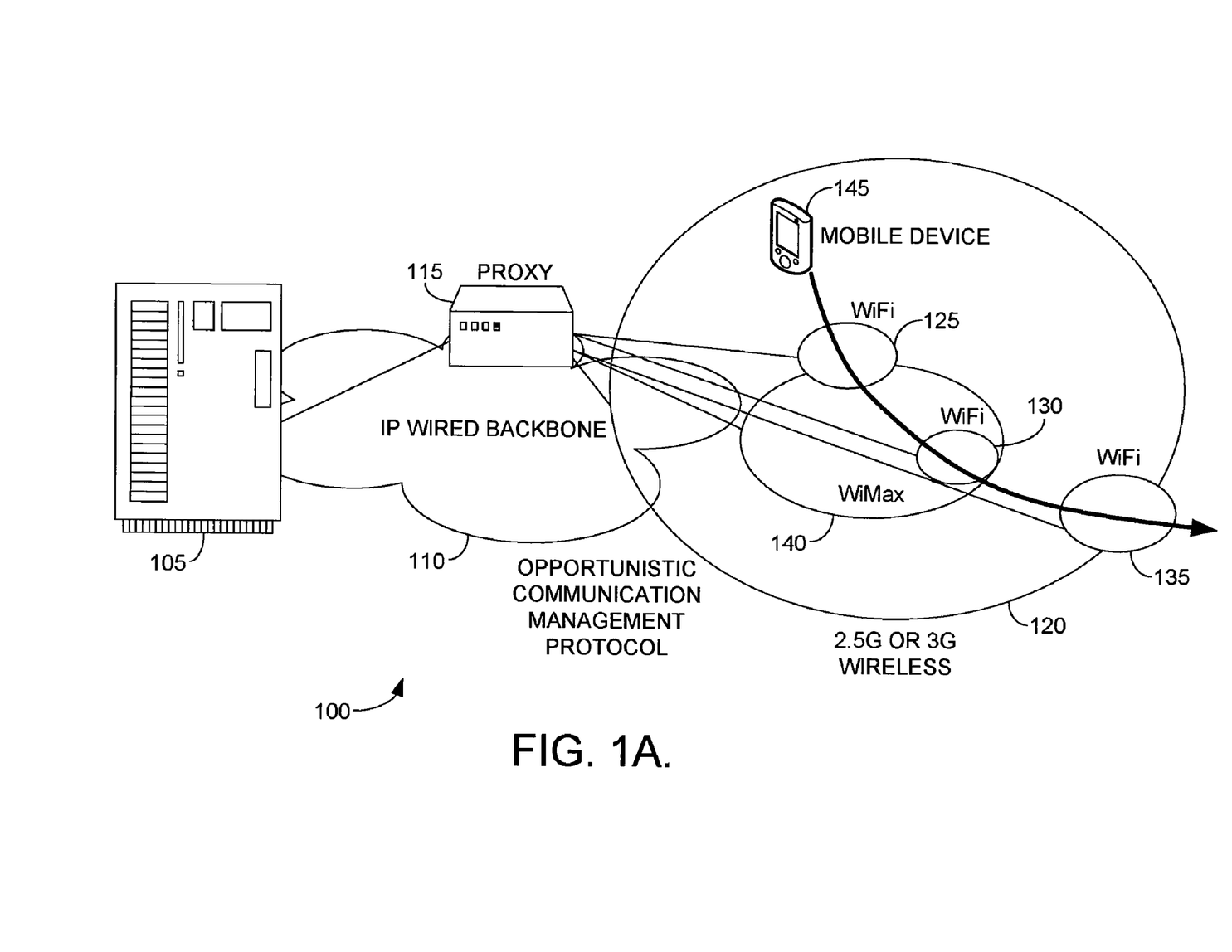
FIG. 1A is a block diagram of an exemplary operating environment suitable for practicing an embodiment of the present invention.

In FIG. 1A, a block diagram of an exemplary operating environment 100 is provided with a host 105 connected to a packet network 110 which is connected to various wireless networks identified by wireless 120, WiFi 125, WiFi 130, WiFi 135, and WiMax 140. Within packet network 110, a proxy 115 may be located that communicates with host 105 and the wireless networks. A mobile device 145 may traverse the wireless networks at different points times as shown by a line with an arrow drawn across the various wireless networks.

Wireless 120 may include various wireless technologies such as W-CDMA, EDGE, GPRS, HSCSD, GSM, CDMA, TDMA, etc. Not all of the wireless technologies have been listed here but various embodiments may be implemented for the present invention. Wireless 120 is distinguished from WiFi and WiMax to provide clarity to the disclosure. WiFi and WiMax may be identified in this document as a wireless network or wireless technology but not as part of wireless 120.

FIG. 1A illustrates an embodiment of the present invention whereby mobile device 145 has multiple network interfaces to enable it to operate with different communications technologies. Mobile device 145 may communicate with host 105 through proxy 115. In the embodiment as shown, proxy 115 may include several network interfaces to enable it to communicate with mobile device 145. As mobile device 145 changes from one wireless environment to another, proxy 115 may continue to communicate with mobile device 145 using the appropriate communications technology. In some cases, mobile device 145 may operate in an environment whereby multiple communications technologies are available such as wireless 120, WiFi 125, and WiMax 140. In these cases, mobile device 145 and proxy 115 may employ data striping to simultaneously provide data over different network interfaces to communicate with each other. In other cases, mobile device 145 and proxy 115 may use an application or a routing policy to dictate the appropriate communications technology to employ leading to a selection of a particular network interface to be used by both devices.

For example, a routing policy may dictate that the cost of wireless 120 is expensive during the day but that a WiFI technology may be cheaper. Therefore, during the day, mobile device 145 may attempt to communicate with proxy 115 over WiFI 125 rather than use wireless 120. However, mobile device 145 may move to a location where WiFi 125 is not available. This may occur when a user leaves home where a WiFi network is available. As the user leaves the WiFi network, say WiFI 125, mobile device 145 and proxy 115 may implement policies to change to an available communications technology such as wireless 120, although wireless 120 is an expensive alternative. As the user moves into an environment where another WiFi network is available, such as WiFi 130, mobile device 145 and proxy 115 may again implement routing policies to communicate over WiFi 130 and terminate communications activity over wireless 120.

Although FIG. 1A illustrates multiple access networks between proxy 115 and mobile device 145, another embodiment of the present invention may be implemented that illustrates direct communications between host 105 and mobile device 145 without the need for proxy 115. In this case, host 105 may have multiple network interfaces enabling it to communicate with mobile device 145 using the various communications technologies. Likewise, with this embodiment, packet network 110 may or may not be implemented. For example, host 105 may communicate using one of the wireless technologies without the need to communicate over packet network 110. Alternatively, host 105 may implement a packet technology and communicate over packet network 110 before data is delivered over a wireless network to mobile device 145.

As FIG. 1A illustrates several wireless technologies for multiple access network communications, other types of communications technologies that are not necessarily wireless may be implemented. For example, mobile device 145 may be a VOP phone, SIP phone, or other computing device with multiple network interfaces to enable it to communicate with various technologies such as MPLS, SIP, ATM, frame relay, TCP, UDP, RTP, etc. Some of these technologies operate together in layers. Some of these technologies have end-user interfaces while others my have only have network interfaces. The list of technologies is not exhaustive for an implementer may implement various embodiments of the present invention.

Figure 1B:
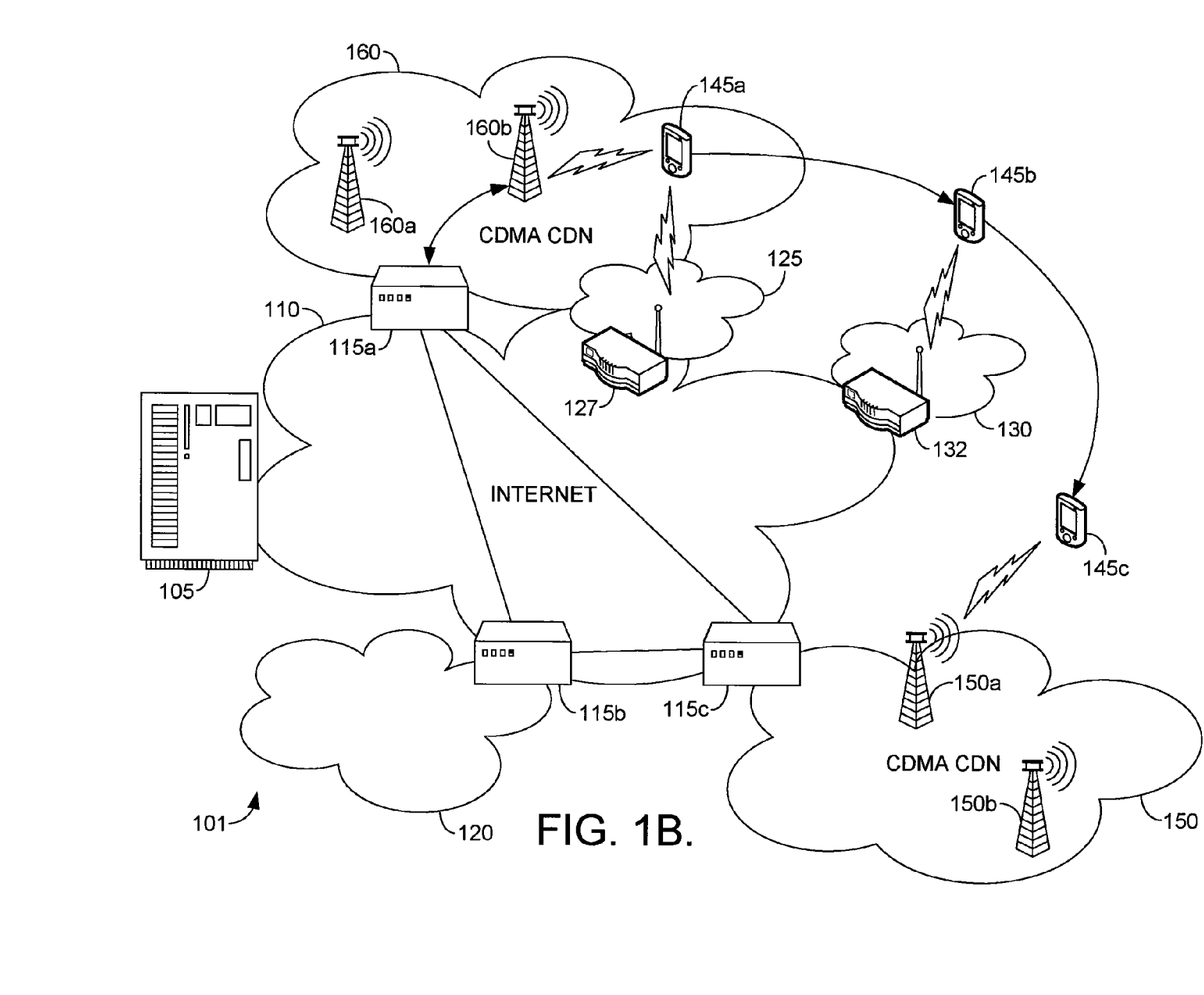
FIG. 1B is a block diagram of another exemplary operating environment suitable for practicing an embodiment of the present invention.

Turning now to FIG. 1B, a block diagram of another exemplary operating environment 101 is shown. FIG. 1B is similar to FIG. 1A and illustrates how an implementer may implement alternative embodiments of the present invention. Host 105 is connected to packet network 110 which is connected to wireless 120, 150, and 160; and WiFi 125 and 130. Mobile device 145 may traverse wireless 120, 150, and 160; and WiFi 125 and 130 as shown by 145a, 145b, and 145c. For illustration, wireless 150 and 160 include towers 150a, 150b, 160a, and 160b while WiFi 125 and 130 include routers 127 and 132.

As discussed above, mobile device 145 (145a, 145b, and 145c) may communicate with various communications technologies. In FIG. 1B, mobile device 145 may communicate with a different CDMA network, a TDMA network or an available WiFI network. For example, different service providers could provide two CDMA networks that are operable with mobile device 145. Or, as mobile device 145 moves to other locations, different networks may become available. In the illustration of FIG. 1B, mobile device 145 (145a, 145b, and 145c) may communicate across the various communications technologies with host 105 through proxy 115a, 115b, or 115c depending on mobile device 145's location and implementation of the application or routing policy discussed above.

Figure 2:
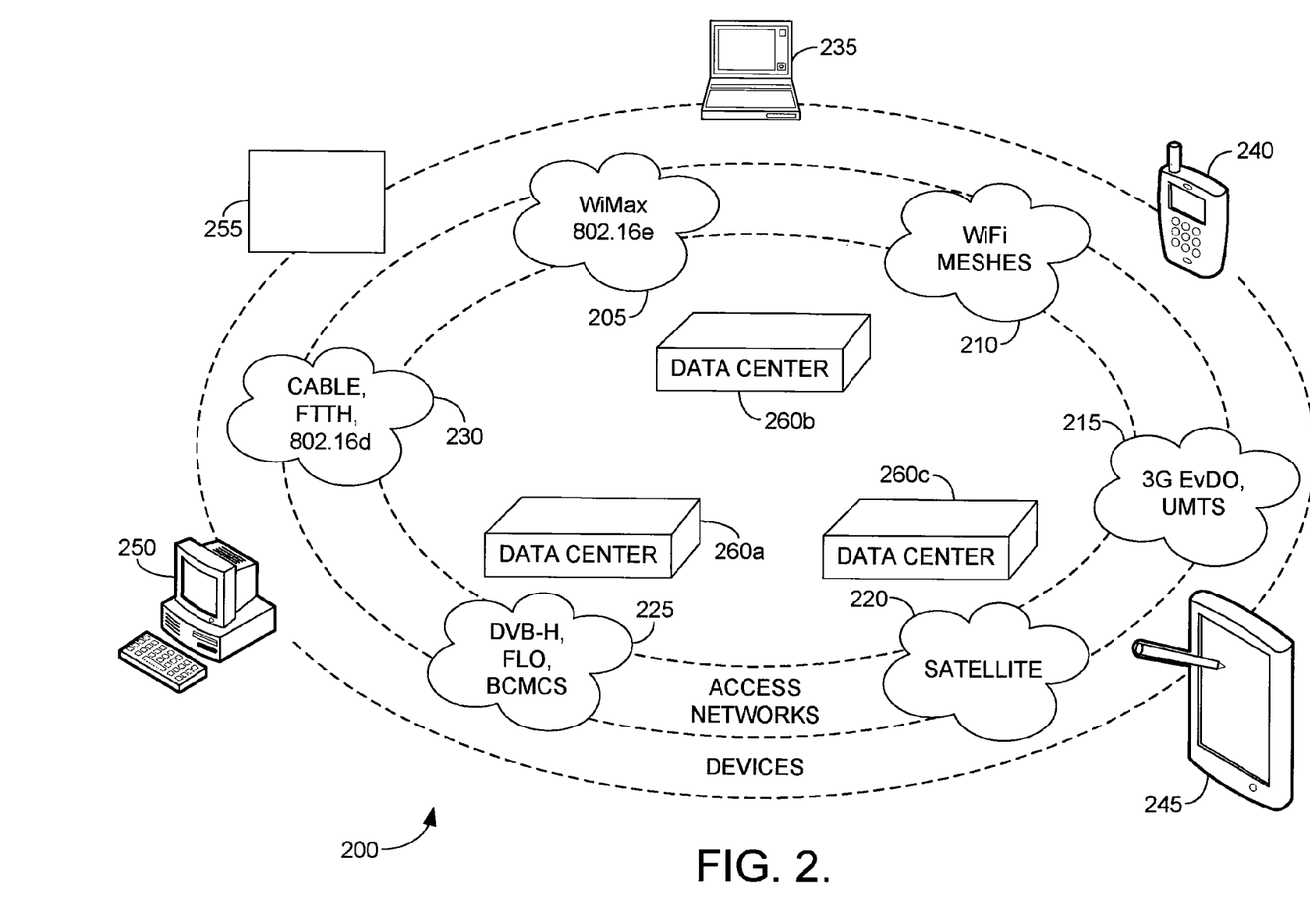
FIG. 2 is a block diagram of an exemplary interworking of access networks and devices when implementing an embodiment of the present invention.

In FIG. 2, a block diagram of an exemplary interworking 200 is shown with a WiMax 205, a WiFi 210, an EvDO 215, a satellite 220, a DVB-H 225, and a cable 230 operating as access networks. The access networks may interface with various devices as shown by a notebook device 235, a mobile device 240, a personal device 245, a computer 250, or any other computing device 255. The various devices may communicate over access networks using different communications technologies to reach each other or to reach data centers 260a, 260b, and 260c. Data centers 260a, 260b, and 260c may include various computing devices or services to provide information through the access network services to the devices. As discussed above, the data centers may have different network interfaces to enable communications with the various access networks and devices.

Figure 3:
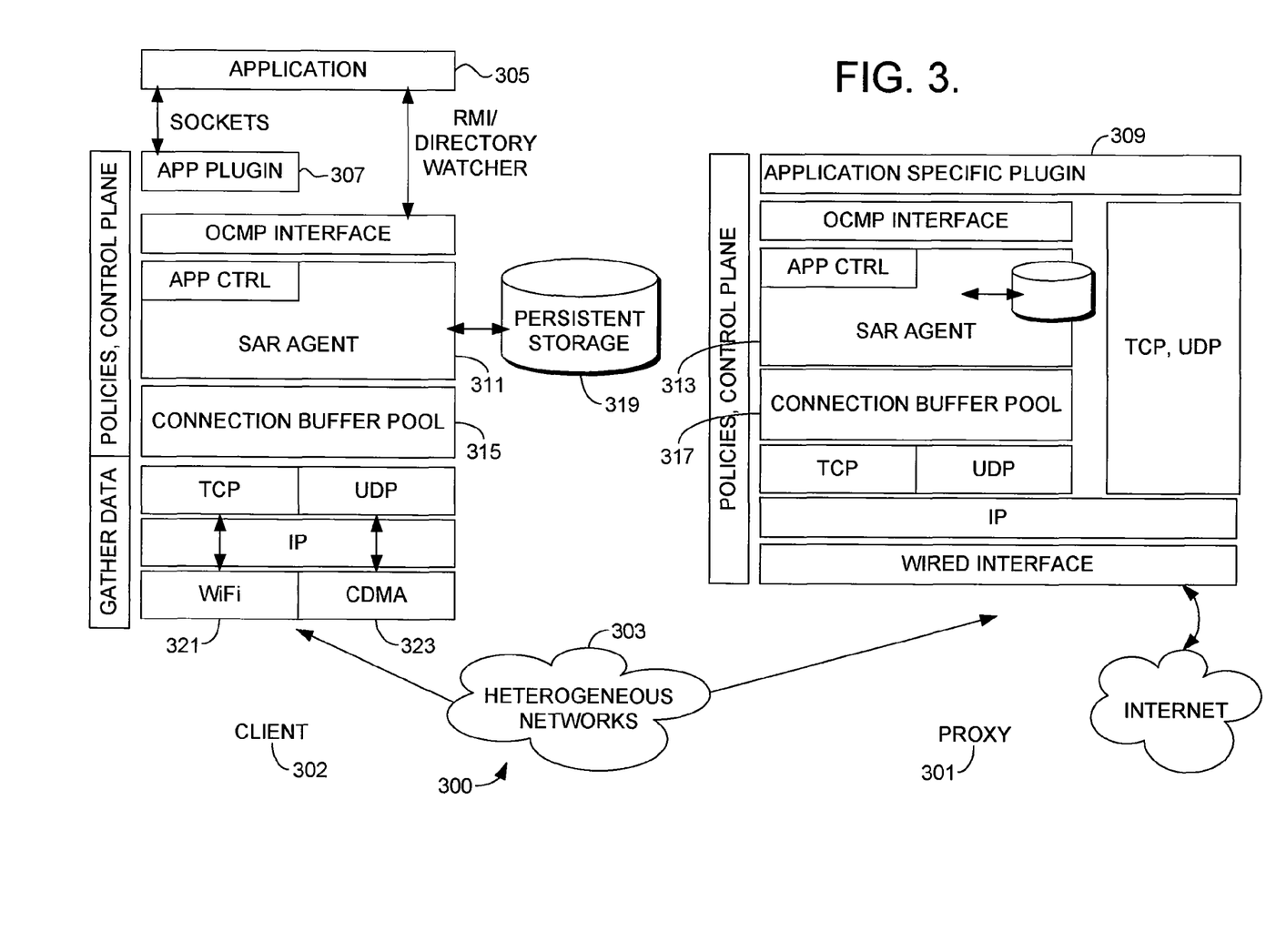
FIG. 3 is a block diagram of a protocol stack of a proxy and a client implemented when practicing an embodiment of the present invention.

Turning now to FIG. 3, a block diagram of a protocol stack 300 between a proxy 301 and a client 302 is shown communicating across heterogeneous networks 303. Proxy 301 may be a computing device including a server or a computer, while client 302 may also be a computing device with mobile capabilities. Client 302 may include mobile telephones, personal digital assistants, etc.

In an embodiment of the present invention, proxy 301 and client 302 represent OCMP stacks that run on a proxy computer and a mobile device respectively. On client 302, OCMP-aware applications 305 interact with OCMP through a communication directory. Socket calls made by legacy applications are intercepted by OCMP, which redirects them to application-specific plugins 307.

It is assumed that applications 305 or their associated plugins 307 may categorize their communications into either a control or one or more data streams. The application control stream provides a control channel between application plugin 307 running on client 302 and a peer application plugin 309 running on proxy 301. For example, the control channel is used to tell a receiver about the length of the bulk data sent on a data stream, or application parameters required by a peer plugin. It can also convey to client 302 the status of the data transfer between plugin 309 on proxy 301 and the legacy servers (not shown).

Each application data stream is assigned to a SAR agent 311 or 313 that segments the data into multiple bundles to support data striping across interfaces. These bundles are queued into a connection pool shared buffer 315 or 317. Connection pool 315 or 317 is an entity that maintains a list of active transport layer connections, one on each interface, and has a shared buffer from which the OCMP scheduler may remove bundles. The scheduler sends each bundle on one of the transport-layer connections depending on network availability and the application-specified policy. The scheduler may also decide what kind of a transport layer to use over which interface and send connection requests to proxy 301. In order to support mobile devices, such as client 302, that switch themselves off to save energy, all bundles in connection pool 315 are also stored in persistent storage 319.

Applications 305 select the interface, identified in this embodiment by WiFi 321 and CDMA 323, for each bundle by registering application callback methods with the OCMP scheduler. These methods are called when the scheduler has to select an outgoing interface for bundles belonging to that application. The handlers for these callbacks can make application-specific decisions with as much control as desired. Different implementers may write applications in a variety of ways in implementing an embodiment of the present invention. A novice programmer may simply return the default interface, while a more sophisticated programmer may take into account variables such as the current time, the energy remaining at client 302 or other relevant factors. For example, applications 305 may send application control messages over a cellular connection such as CDMA 323 and application data on WiFi 321 connections. Other policies may include an intelligent striping mechanism that takes the cost and power consumption on different interfaces into account. Similar policies are also supported in application plugins 309 running on proxy 301, and the policy parameters are conveyed to proxy 301 by encapsulating them in application control messages.

At proxy 301, incoming bundles are processed by a symmetric stack and eventually handed to application-specific plugin 309. These plugins may be loaded into OCMP dynamically to use the OCMP API directly. The plugin may then take application-specific actions to transfer data to a legacy server. The plugin may also obtain data from the legacy server on behalf of an application and store it in connection pool buffer 317 for client 302. When client 302 opportunistically connects with proxy 301, bundles in connection buffer pool 317 are queued on the appropriate transport layer connection and sent to client 302.

Figure 4:
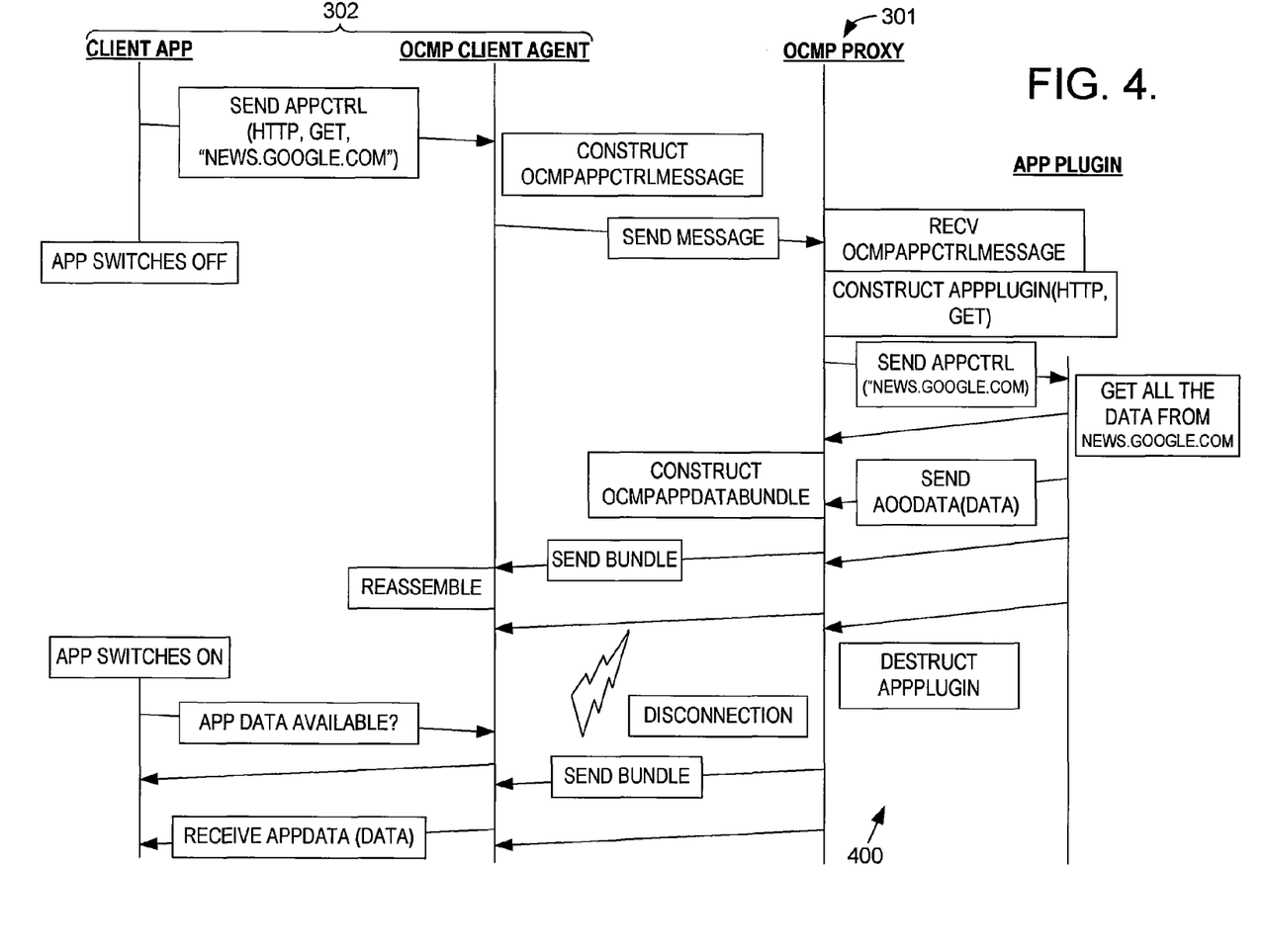
FIG. 4 is a block diagram of an exemplary data flow between the proxy and the client when practicing and embodiment of the present invention.

In FIG. 4, a block diagram of an exemplary data flow 400 is shown between proxy 301 and client 302. In an implementation of an embodiment of the present invention, proxy 301 acts as an application-level gateway by dynamically loading application-specific plugins to communicate with a third-party content server (not shown) on behalf of client 302, and conducting delay-tolerant data transfers between the plugin and the application running on client 302.

Figure 5:
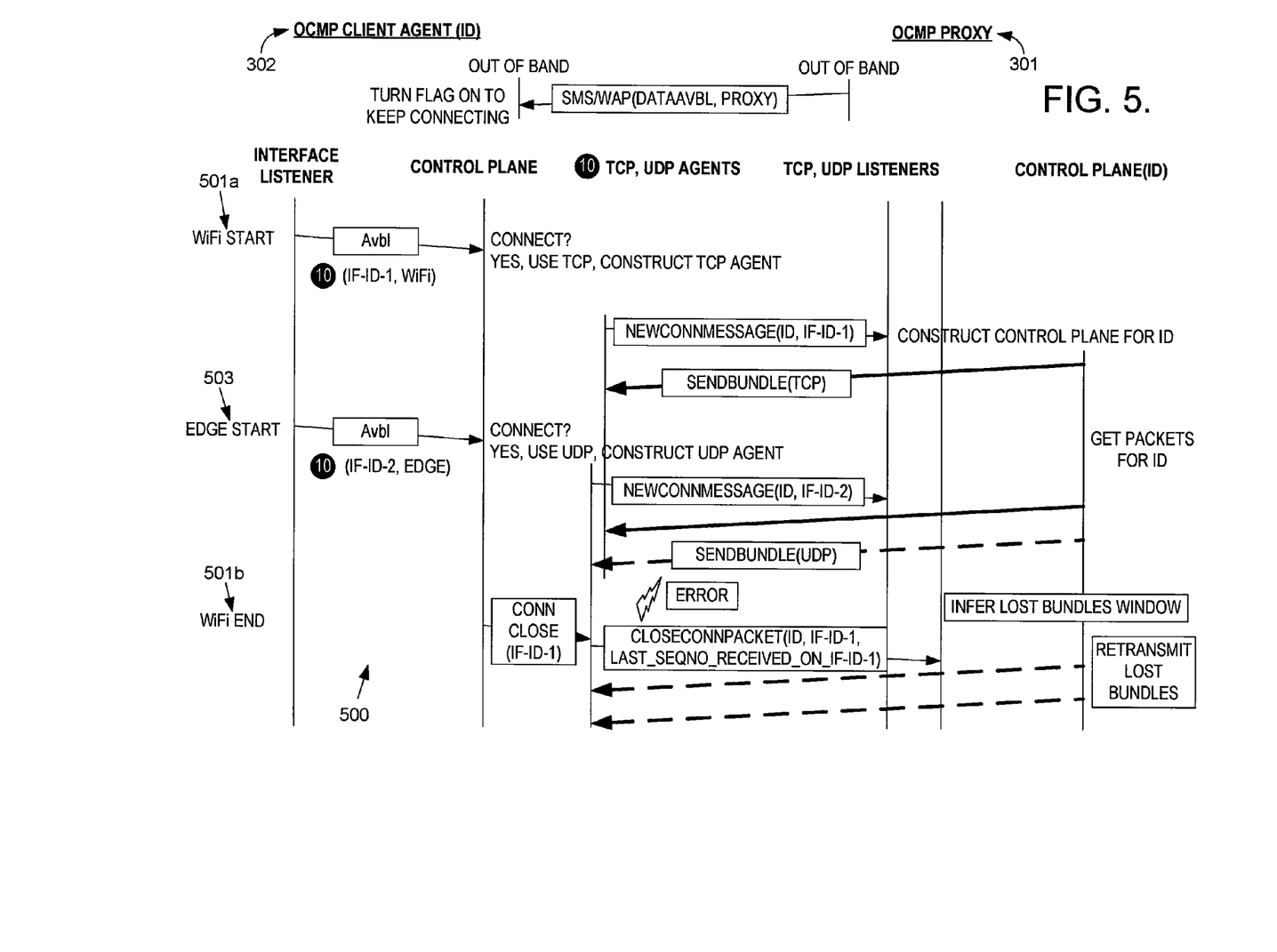
FIG. 5. is a block diagram of an exemplary control flow of a commencement of a WiFi connection, followed by an EDGE connection, and a termination of the WiFi connection illustrating an implementation of an embodiment of the present invention.

Referring now to FIG. 5, a block diagram of an exemplary control flow 500 is shown for starting a WiFi connection 501a, followed by starting an EDGE connection 503, and terminating the WiFi connection 501b. Client 302 uses both WiFi and EDGE for data transfer.

The protocol begins when OCMP proxy 301 notifies client 302 that it has data waiting to be picked up by client 302. It is assumed that these notifications may be sent through an out-of-band mechanism, such as SMS. When client 302 receives this notification, it asks the interface listener module to raise an event whenever client 302 connects to a new network. Thus, when client 302 connects to WiFi 501 (not shown but assumed from 501a and 501b), the OCMP control layer decides to use TCP as a transport layer on WiFi 501 to connect to proxy 301. The connection is initiated through a control message, which first instantiates an OCMP connection pool entity for client 302 on proxy 302 if it did not exist already. The connection is then added into the connection pool. Similarly, a new transport layer connection is created when client 302 enters into EDGE coverage, this time using a reliable UDP protocol. Proxy 301 may now stripe data on both connections, or use policy feedback from the application to regulate the relative data rates on each connection. If one connection breaks uncleanly, the other connection may be used to send control messages to proxy 301 so that proxy 301 does not have to wait until a TCP timeout to detect the connection failure.

Figure 6:
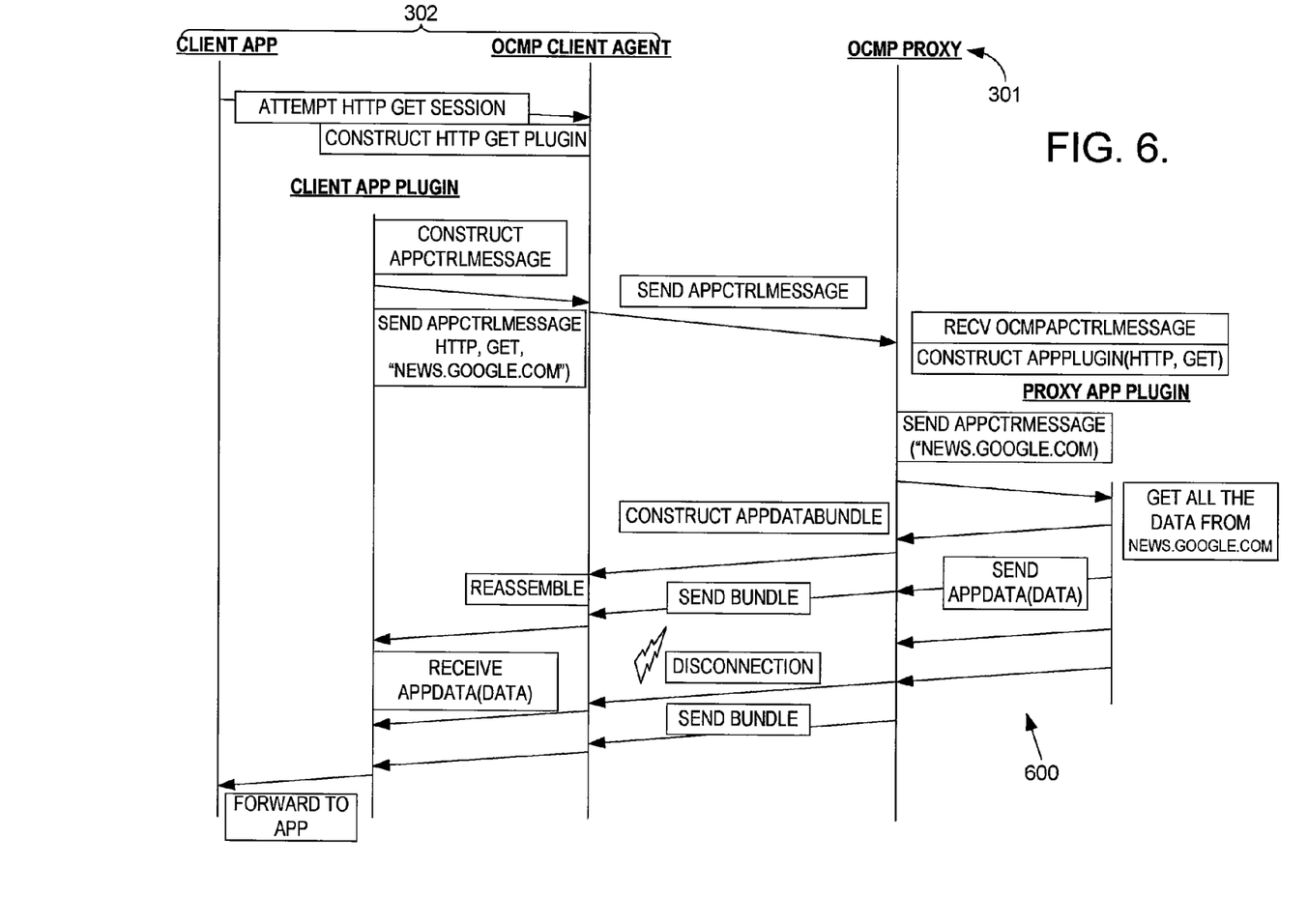
FIG. 6 is a block diagram of a data transfer sequence for creating application plug-ins when implementing an embodiment of the present invention.

In FIG. 6, a block diagram of a data transfer sequence 600 for creating application plug-ins is shown. Both proxy 301 and client 302 support application-specific plugins identified above in 307 and 309. These short-lived code modules are invoked to carry out application-specific actions for each client-server interaction. All applications need a plugin at proxy 301, and legacy applications need a plugin at client 302 as well. For example, a legacy web browser request on client 302 is associated with an instance of a HTTP plugin both on client 302 on proxy 301 that initiates an HTTP GET on its behalf. The proxy-side plugin stores the results in persistent storage and communicates the results to client 302 over opportunistic links shown above as heterogeneous networks 303. Other examples are a blog plugin to support upload from client 302 to a blog, and a flickr plugin to upload a photograph to flickr. Additional information on blog and flickr may be obtained at web addresses www.blogger.com and www.flickr.com. Application plugins attempt to mask client 302's disconnections from legacy applications either at client 302 or at the content host.

An instance of a plugin is created on client 302 if OCMP intercepts a socket call made by legacy applications. The destination port number or the first few bytes written into the socket are used to disambiguate different applications from each other, and a corresponding plugin object is created to handle the connections. Whenever a new plugin (307) is created, or a new file is dropped into the 'communication directory', an application control message is also sent to proxy 301 to ask it to dynamically instantiate a peer plugin (309) on proxy 301.

Figure 7:
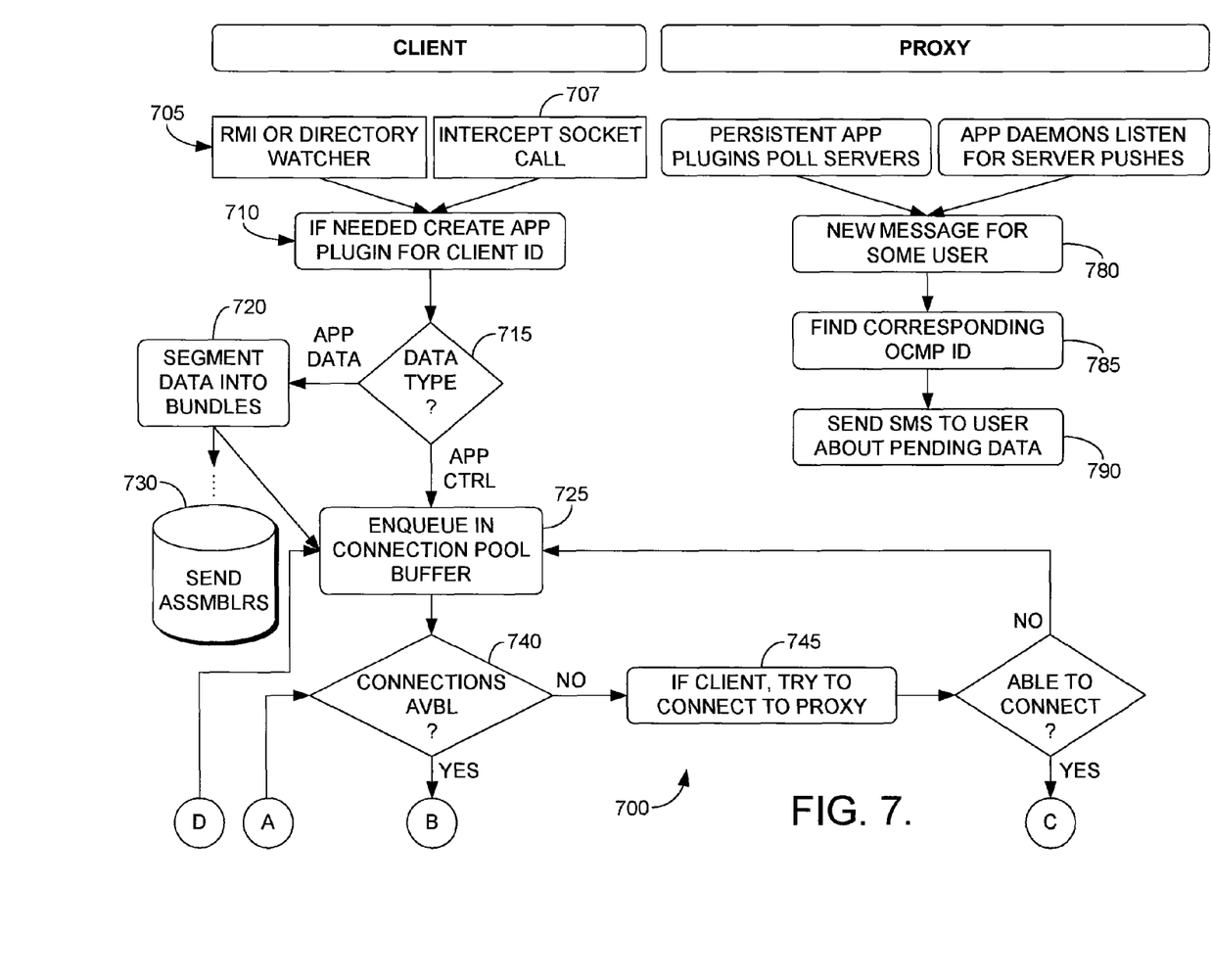
FIG. 7 is a flowchart of an exemplary process for providing a data connection between a proxy and a client when implementing an embodiment of the present invention.

In FIG. 7, a process for providing a data connection between a proxy and a client is shown in a method 700. Steps 705 and 707 begin when the client has data it needs to send. An application on the client either makes a socket call or drops a file in the directory watcher. If needed, an application plugin is created at a step 710. At a step 715, the data type is determined. If it is an application control message, it is queued in the connection buffer pool in a step 725. If it is application data, it is segmented into bundles in a step 720, stored in persistent store in a step 730, and queued in the connection buffer pool in step 725. At a step 740, the availability of connections is determined. If no connections are available at step 740, the client attempts to connect to the proxy in a step 745. If the connection can be made, a new connection messages is created with the last sequence number received in a step 750 and an OCMP Control message is sent to select a connection in a step 755. If the client is not able to connect to the proxy, the data remains in the connection pool buffer in step 725. If connections are available at step 740, a connection is selected at step 755, bundles are then de-queued from the buffer and there is an attempt to send the data in a step 760. If the data was not successfully sent in a step 765, the connection is checked, and if the connection is dead in a step 770, a close connection message is sent in a step 775 and available connections are checked again in step 740.

The process of sending new data begins on the proxy side when the proxy receives a new message to deliver to the client 780. The proxy finds the corresponding OCMP ID in a step 785 and sends a notification to the client through an out-of-band mechanism, such as SMS in a step 790.

Figure 8:
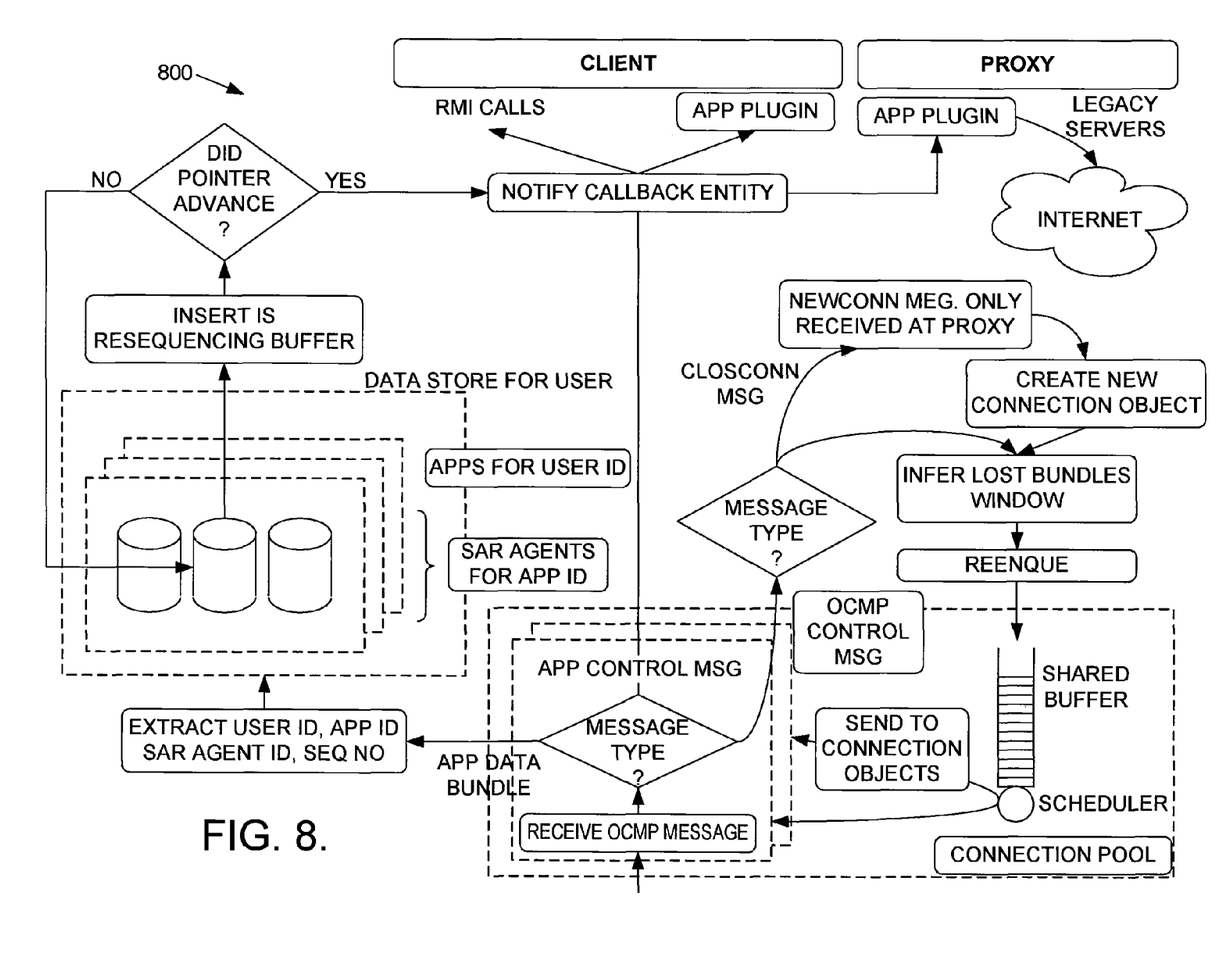
FIG. 8 is a flowchart of another exemplary process for providing a data connection between a proxy and a client when implementing an embodiment of the present invention.

Turning now to FIG. 8, another process for providing a data connection between a proxy and a client is shown in a method 800. Method 800 is similar to method 700 except that method 700 discusses the process in terms of a sender for the client and the proxy while method 800 discusses the process in terms of a receiver for both the client and the proxy. As such, the details of the process in both method 700 and method 800 are exemplary for discussing an implementation of an embodiment of the present invention. Furthermore, details of the steps of method 800 are not discussed here but information is provided in the illustration of FIG. 8.

Throughout the disclosure, details are discussed for various embodiments of the present invention. As part of this disclosure, the document entitled "Application Support for Opportunistic Communication on Multiple Wireless" by A. Seth, S. Bhattacharyya, and S. Keshav is hereby incorporated by reference in its entirety. The document entitled "Opportunistic Data Transfer Over Heterogeneous Wireless Networks" or "Opportunistic Communication Over Heterogeneous Access Networks" by A. Seth, S. Keshav, and S. Bhattacharyya is hereby incorporated by reference in its entirety.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer system having a processor and a memory, the computer system operable to execute a method for maintaining a wireless communication connection over different wireless technologies, comprising:
   communicating between a mobile device and another device over a first wireless technology in a first wireless network wherein the first wireless technology implements an Opportunistic Connection Management Protocol (OCMP), wherein the mobile device communicates through a proxy to the another device, and wherein the mobile device and the proxy have an OCMP interface and a segmentation-and-reassembly agent that segments data into bundles;
   detecting at the mobile device a second wireless technology in a second wireless network while communicating between the mobile device and the another device over the first wireless technology in the first wireless network;
   in response to detecting the second wireless technology, striping the bundles across the first wireless technology and the second wireless technology for exchange between the mobile device and the another device, wherein the proxy receives the bundles transferred by the mobile device and reassembles the bundles for delivery to the another device;
   based on one or more policies, a signal strength, or a bandwidth, halting the communication between the mobile device and the another device over the first wireless technology in the first wireless network and maintaining the communication over the second wireless technology in the second wireless network between the mobile device and the another device.

2. The system of claim 1, wherein transferring the communication comprises:
   implementing a set of criteria by the first wireless network when the second wireless network is available;
   determining if the set of criteria is met for the one or more policies, the signal strength, or the bandwidth; and
   if the set of criteria is met, switching the communication from the first wireless network to the second wireless network.

3. The system of claim 2, wherein the second wireless technology implements the OCMP.

4. A computer system having a processor and a memory, the computer system operable to execute a method for seamlessly transferring a communication connection from a first wireless network and a mobile device to a second wireless network and the mobile device, comprising:
   operating the mobile device in a communication session in the first wireless network wherein the first wireless network implements an Opportunistic Connection Management Protocol (OCMP) where the mobile device communicates through a proxy to the another device and the mobile device and the proxy have an OCMP interface and a segmentation-and-reassembly agent that segments data into bundles, knows a location of the mobile device, and knows the location of the second wireless network;
   when the mobile device moves into a vicinity of the second wireless network, with the OCMP, striping the bundles across the first wireless network and the second wireless network for exchange between the mobile device and the another device, wherein the proxy receives the bundles transferred by the mobile device and reassembles the bundles for delivery to the another device; and
   if a set of conditions is met, halting the communication session over the first wireless network and maintaining the communication session over the second wireless network wherein the OCMP interfaces with the first wireless network and the second wireless network to facilitate a transfer of all further bundles over the second wireless network.

5. The system of claim 4, wherein meeting the set of conditions comprises exceeding a threshold for at least one of a bandwidth and a signal strength in the second wireless network.

6. The system of claim 5, further comprising transferring the communication session to the first wireless network when the second wireless network becomes unavailable.

7. The system of claim 5, further comprising transferring the communication session to the first wireless network when at least one of the bandwidth and the signal strength is below the threshold in the second wireless network.

8. A system for a simultaneous data transfer communicating with multiple wireless networks, comprising:
   an Opportunistic Connection Management Protocol (OCMP) interfaces with at least two or more wireless networks wherein the OCMP is a set of computer software that operates on a mobile device or a computing device wherein each of the mobile device and the computing device has a processor coupled to a memory and has at least two or more interfaces to communicate with the at least two or more wireless networks;
   the OCMP provides for a simultaneous, parallel, and sustained download striping or a simultaneous, parallel, and sustained upload striping of a set of information over the at least two or more wireless networks between at least one of the mobile device and the computing device, and the multiple networks wherein striping the set of information transfers simultaneously over each of the at least two or more wireless networks; and
   the OCMP aggregates the set of information that is downloaded or uploaded at the at least one of the mobile device and the computing device.

9. The system of claim 8, wherein the OCMP comprises a client that resides on at least one of the mobile device and the computing device, in the at least two or more wireless networks.

10. The system of claim 9, wherein the OCMP comprises a proxy that resides on one or more computing devices in the at least two or more wireless networks.

11. The system of claim 10, wherein the proxy and the client communicate together over the at least two or more wireless networks.

12. The system of claim 11, wherein the at least two or more wireless networks or a subset of the multiple wireless networks are different.

* * * * *